United States Patent [19]

Tsuchiya

[11] Patent Number: 5,044,695
[45] Date of Patent: Sep. 3, 1991

[54] SEAT BELT STORAGE STRUCTURE IN A HINGED SEAT

[75] Inventor: Fumiaki Tsuchiya, Akishima, Japan

[73] Assignee: Tachi-S Co., Ltd., Tokyo, Japan

[21] Appl. No.: 378,935

[22] Filed: Jul. 12, 1989

[51] Int. Cl.$^5$ .............................................. B60R 22/00
[52] U.S. Cl. .................... 297/481; 297/191; 297/468
[58] Field of Search ............... 297/481, 463, 191, 113, 297/482

[56] References Cited

U.S. PATENT DOCUMENTS 4,210,365  7/1980  Breitschwerdt et al. ............ 297/481
4,560,203  12/1985  Huber ............................ 297/113 X
4,810,037  3/1989  Takagi ........................... 297/113

FOREIGN PATENT DOCUMENTS 51126    5/1982   European Pat. Off. ............ 297/481
126226   10/1978  Japan .
1172458  12/1969  United Kingdom ................ 297/481

Primary Examiner—Peter R. Brown
Attorney, Agent, or Firm—Browdy and Neimark

[57] ABSTRACT

A seat belt storage structure in a hinged seat, in which the hinged seat includes a seat cushion and seat back, each of them being individually hinged such as to be rotatable about their respective hinge points in a forward direction, and there is formed a seat belt storage slit in the seat back, in which slit, the free end of the seat belt is inserted and stored removably. The seat belt storage slit is formed by an inner cloth cell which is attached in a recessed hole of the seat back and further sewn with a covering member of the seat back.

2 Claims, 3 Drawing Sheets

SEAT BELT STORAGE STRUCTURE IN A HINGED SEAT

BACKGROUND OF THE INVENTION

1. Field of the Invention

The present invention relates to a structure for storing a seat belt in a hinged seat of the type wherein a seat cushion and seat back are each so hingedly rotatable as to be subject to their respective forward displacements for transformation into a load-carrying platform or the like.

2. Description of Prior Art

As known well, the hinged seat is used mainly for a rear seat in an automobile because of its easy folding transformation into a load-carrying platform. Reference is made to FIGS. 1(A) to 1(C), in which such hinged seat is shown and it is seen that a seat cushion (124) is raised forwardly to an upright state and then a seat back (114) is laid down to a horizontal state, thus providing a space or platform for loading some articles or baggages thereon.

Like a front seat, a recent trend is for a seat belt to be also equipped in the rear seat of this hinged kind. The seat belt, in general, is formed by an upper belt with a tongue and a lower belt with a buckle, such that the tongue is removably engaged into the buckle for laying the seat belt on the body of an occupant on the seat and restraining it thereto for a safety purpose. FIGS. 1(A) to (C) show a conventional seat belt arrangement in the hinged seat, in which a lower belt (120) with a buckle (122) is at its base end fixed upon the floor (119) of an automobile.

According to this prior art, as in FIG. 1(A), when the hinged seat (101) is in a normal seat formation state, the lower seat belt (120) extends through the juncture between the seat back (114) and seat cushion (124) and the buckle (122) appears upon the seat cushion (124) for use such as to be engaged with a tongue of an upper seat belt (not shown). Then, with reference to FIG. 1(B), the seat (101) is transformed into a load-carrying platform by rotating upwardly the seat cushion (124) about the hinge point (125) firstly and then rotating forwardly the seat back (114) down onto the floor (119) about the hinge point (126). Here, the buckle (122) is pressed exceedingly by the seat back (114), with a much likelihood of the buckle (112) or the pressed surface of the seat back (114) being damaged or broken. What is worse, as in FIG. 1 (c), when returning those seat back and seat cushion (114)(124) to the foregoing normal states in the arrow direction, the buckle (122) is completely out of view beneath the seat cushion (124) and thus out of reach of the occupant for using the seat belt, which gives the occupant the trouble of seeking for and picking up the buckle (122), presenting an annoying drawback in using the seat belt.

To solve that problem, the Japanese Laid-Open Utility Model Publication No. 53-126226 suggests the provision of a seat belt storage container in the seat back, in which the lower seat belt with a buckle may be taken out from or stored in the storage container in order to be engaged with or disengaged from the tongue of upper seat belt. Thus, before folding the seat forwardly, the buckle is stored in the storage container so as to eliminate the above-mentioned drawbacks that the buckle is pressed badly or missed from view by the seat back.

However, in this prior art, the storage container is made of a hard material, such as a plastic. This results in giving a hard, objectional touch to the back of the occupant. Further, the storage container needs to be formed separately and when it is jointed to the seat back, a special sewing or jointing technique is required because the mouth portion of the storage container is to be sewn the corresponding portion of a covering member of the seat cushion. The costs in that respect are then higher. Moreover, the edge of the mouth portion of the storage container is exposed on the seat back, which results in giving an unpleasing touch to the occupant and also deteriorating the outer aesthetic appearance of the seat.

SUMMARY OF THE INVENTION

In view of the above-mentioned drawbacks, it is therefore a first purpose of the present invention to provide an improved seat belt storage structure in a hinged seat which avoids an unpleasing hard touch and impairment of the aesthetic appearance of the seat.

In accomplishing the purpose, according to the present invention, an inner cloth cell of one-opened pouch type is attached in a recessed hole formed in a seat back of the seat the seat back comprising an elastic foam padding and a covering member, and further the inner cloth cell is sewn with the covering member of the seat back, to thereby provide a seat belt storage slit in which the free end or buckle of seat belt is removably stored.

Accordingly, the seat belt, when stored in the storage slit, is prevented against removal therefrom, and the storage slit is elastically deformable by virtue of its being formed of the elastic foam padding and cloth-made inner cell, thus giving no unpleasing hard touch to an occupant on the seat.

In one aspect of the present invention, the inner cloth cell is simply attached and jointed to the recessed hole of the seat back, which is much simplified in structure and assembling in comparison with the hard material used in the prior art. Further, the inner cloth cell may be formed even by a waste cloth, which adds to the economical advantages and reduces greatly the costs involved.

DETAILED DESCRIPTION OF PREFERRED EMBODIMENT OF THE INVENTION

Figure 1A:
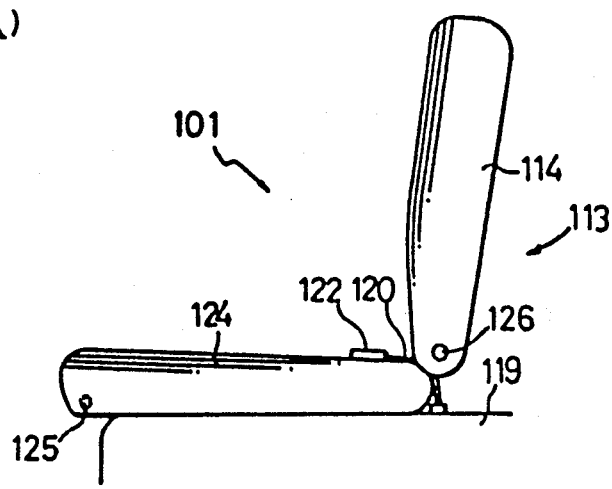
FIGS. 1(A), 1(B) and 1(C) are explanatory schematic side views of a conventional hinged seat, showing roughly the seat formations thereof.
Figure 1B:
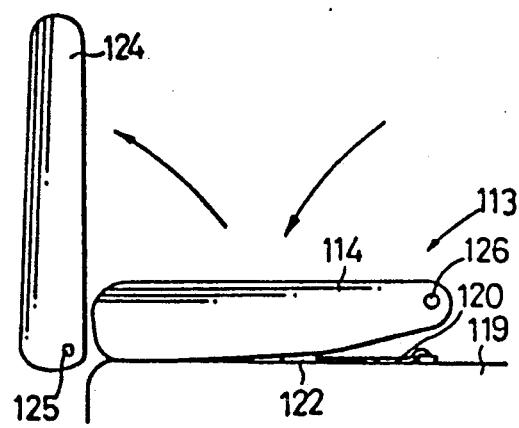
Figure 1C:
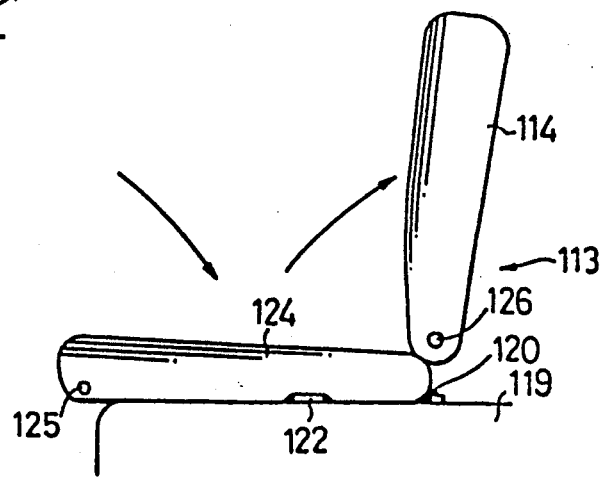

Referring firstly to FIGS. 3 and 4(A) through 4(C), there is shown a conventional hinged seat of a bench type (1) substantially identical to that of the previously mentioned prior art. The hinged seat (1) is essentially composed of a seat cushion (24) which is hingedly connected to the floor (19) of an automobile (not shown)

via a first hinge (25) and a seat back (14) which is hingedly connected to the side of the floor (19) via a second hinge (26). The seat cushion (24) and seat back (14) are rotatable individually, respectively about the first and second hinge points (25)(26) in the arrow directions, i.e. in a forward direction, so that the seat (1) may be transformed into a platform-like state on which to be placed some articles or baggages, as in FIG. 4(B), and may be turned back therefrom in the reverse arrow directions to the normal seat formation as in FIG. 4(C), in the same manner as in the prior art description above.

Figure 2A:
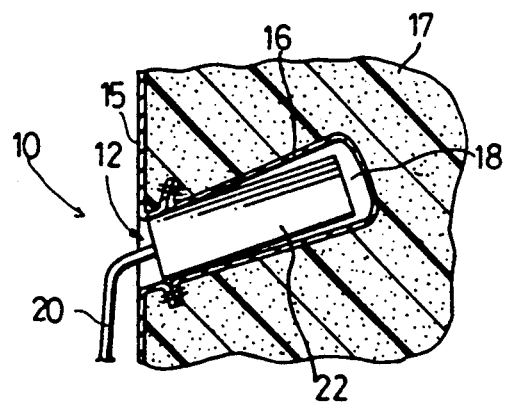
FIG. 2(A) is a sectional view showing a principal part of a seat belt storage structure for a hinged seat in accordance with the present invention.
Figure 2B:
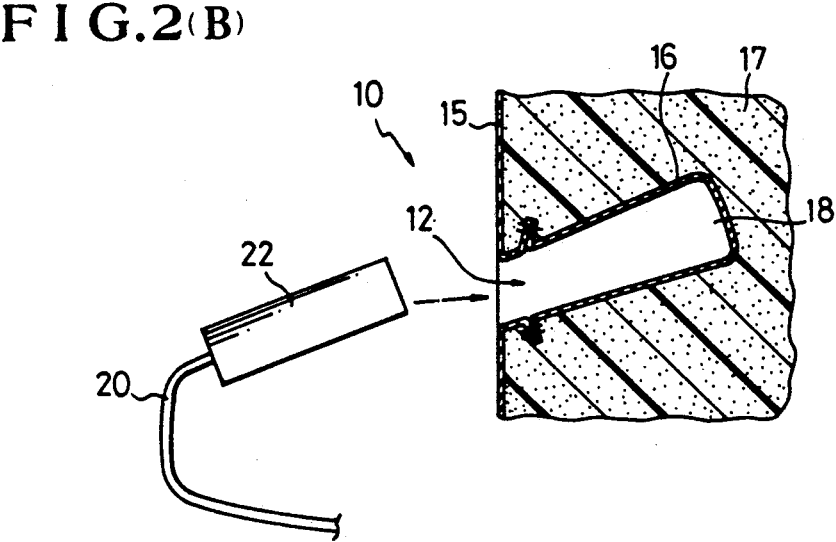
FIG. 2 (B) is a sectional view showing the state in which a buckle of a seat belt is to be stored in a seat belt storage slit formed in a seat back.
Figure 3:
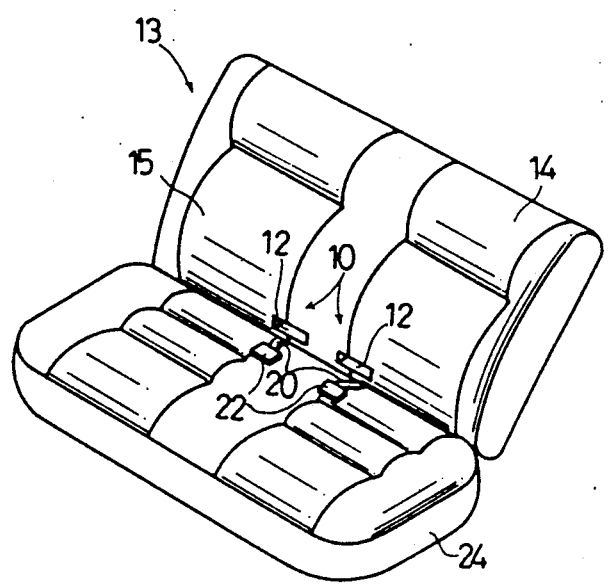
FIG. 3 a perspective view of a hinged seat provided with the seat belt storage structure in accordance with the present invention.

Reference being now made to FIGS. 2(A) and 2(B) in conjunction with FIG. 3, there is illustrated a structure for storing a pair of lower seat belts (20)(20), each having a buckle (22), in the seat back (14), in accordance with the present invention.

Although not shown, the lower seat belts (20)(20) are a part of a complete seat belt adapted to restrain an occupant to the seat (1), which of course includes a pair of upper seat belts each having a tongue to be removably engageable with the respective buckles (22)(22) of the lower seat belts (20)(20).

At the lower part of the seat back (14), adjacent to the juncture between the seat back and seat cushion (14)(24), are formed a pair of seat belt storage slits (12)(12).

Figure 4A:
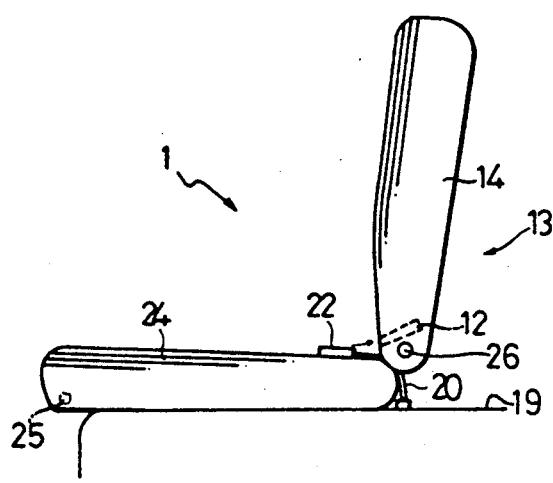
FIGS. 4(A), 4(B) and 4(C) are explanatory schematic side views of the hinged seat as in the FIG. 3, showing the seat movements thereof.

In this context, the two seat belts (20)(20), as best shown in FIGS. 4(A), are at their base ends fixed on the floor (19) and extend through the clearance in the foregoing juncture towards the frontal side of the seat (1), with their respective buckles (22)(22) being disposed below the seat belt storage slits (12)(12) for a better access of the buckles (22)(22) to the latter.

Referring to FIGS. 2(A) and 2(B), let us describe one of the two seat belt storage slits (12)(12) because of their structural identity, hereinafter.

The storage slit (12) is constructed by forming a recessed hole (18) in an elastic foam padding (17) made of a polyurethane and the like which is a part of the seat back (14) such that the recessed hole (18) has a sufficient inner space for the buckle (22) to be inserted and stored therein, and attaching an inner cloth cell (16) of one-opened pouch type into the inner wall of the recessed hole (18), with the forward mouth ends of the inner cloth piece (16) being sewn to the mating portions of a covering member (15) at jointed points (J). The inner cloth cell (16) is formed in advance at a proper size matching to the inner volume of the recessed hole (18), to thereby permit its being easily inserted and settled securely within the recessed hole (18). Preferably, the mouth portion of the seat belt storage slit (12) is formed in a relatively narrow way with respect to its internal storage hollow as well as to the outer dimensions of the buckle (22). This prevents the buckle (22), when stored in the slit (12), against removal therefrom, by reason of the elastic padding (18) serving to give a resilient gripping force to the buckle (22) at the mouth portion of the slit (12). Further, needless to state, such elastic property permits easy insertion of the buckle (22) into the narrow mouth of the slit (12).

Figure 4B:
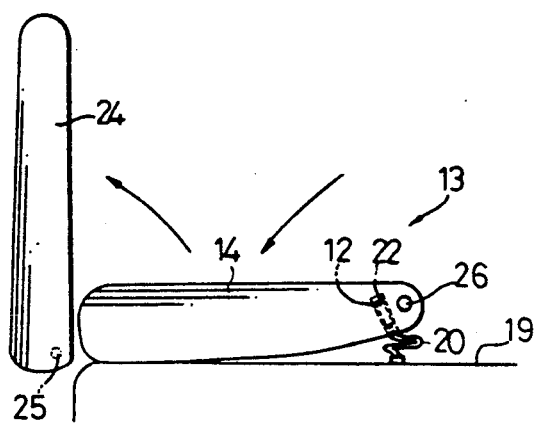
Figure 4C:
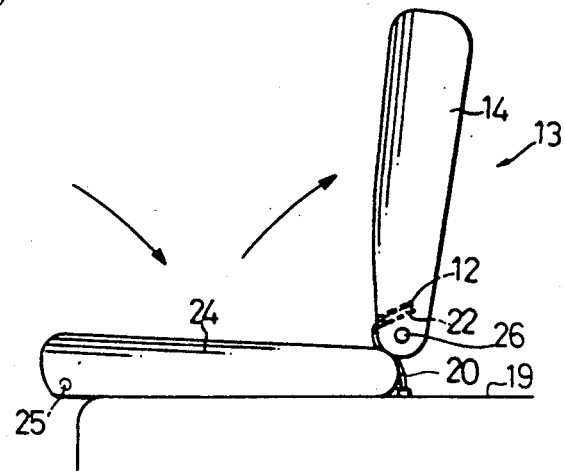

Now, a description will be made as to the way in which the lower seat belt (20) is stored in the storage slit (12), with reference to FIGS. 4(A) to 4(C). Firstly, as seen in FIG. 4(A), the buckle (22) of the lower seat belt (20) is placed on the seat cushion (24) for use, namely for engagement with a tongue of the upper seat belt (not shown). Then, prior to turning the hinged seat (1) to the platform state in FIG. 4(B), the buckle (22) is to be inserted into the storage slit (12) in the arrow direction as shown in FIG. 4(A). With the buckle (22) stored in the slit (12), as in FIG. 4(B), the seat cushion (24) is rotated upwardly about the first hinge point at (25) to an upright state and then the seat back (14) is rotated downwardly about the second hinge point at (26) to rest upon the floor (19), as directed in the arrow. It is seen that the buckle (22) remains attached with the seat back (14) during the forward rotation of the seat back (14), and even in the laid-down state of the seat back (14) as in FIG. 4(B), the buckle (22) is still attached to the rearward end of the seat back (14) and thus the lower seat belt (20) remains situated at the frontal surface side of the seat back (14), keeping its connection therewith. Accordingly, both buckle (22) and lower seat belt (20) are positively kept in a connected relationship with the seat back (14) and prevented against missing beneath the seat back (14) as found in the prior art. The same is also true when such load-carrying platform plate of the seat (1) is turned back to the normal seat formation as in FIG. 4(C): Namely, with the first upward rotation of the seat back (14) about the hinge (26), the lower seat belt (20) is stretched upwardly due to the buckle (22) being still stored in the slit (12), and then, with the second downward rotation of the seat cushion (24) about the hinge (25), the upper end of the seat cushion (24) is brought into the space under the lower end of the seat back (14), thereby defining a juncture between the seat back and cushion (14)(24). As is apparent, the lower seat belt (20) is sandwiched in such juncture, whereby both buckle (22) and lower seat belt (20) are situated at the frontal side of the seat (1), thus giving a direct access to them, so that the buckle (22) may be taken out from the storage slit (12) by the hand of an occupant who sits on the seat (1) for an engagement with a tongue of an upper seat belt (not shown) to complete attaching a seat belt around the body of the occupant.

From the above description, it is appreciated that the inner cloth cell (16) is made of a cloth which is soft as opposed to the hard plastic material used in that of the prior art, and as such, the storage slit (12) per se, in which the inner cloth cell (16) is laminated at the recessed hole (18) of the elastic foam padding (17), is given a flexibility and deformability with a self-recovery, so that, when an occupant leans his back against the seat back (14), the storage slit (12) is elastically deformed in harmony with the surrounding areas of the seat back (14), and no unpleasing hard touch is felt by the occupant. Further, at the mouth of the slit (12), there is no edges associated with the inner cloth cell (16), which contributes to the improvement of aesthetic appearance of the seat as well as the ease with which the inner cloth cell (16) is jointed to the covering member (15). This is clearly in contrast to the plastic inner container which is difficult to be jointed to a covering member and creates an aesthetically poor edge at the mouth of the seat belt storage slit. Still further, the inner cloth cell (16) may be formed even by a waste cloth and therefore, the costs for assembling the seat are reduced easily.

It should be understood that the present invention is not limited only to the illustrated embodiment, but various other modifications, replacements and additions may structurally be possible without departing from the spirit and scope of the appended claims for the invention.

What is claimed is:

1. A seat belt storage structure in a hinged seat, in which said hinged seat includes a seat cushion hinged at a first hinge point and a seat back hinged at a second hinged point, such that said seat cushion and seat back are respectively rotatable about said first and second hinge points in a forward direction, and in which a recessed hole is formed in said seat back, said recessed hole being so adapted that an end of a seat belt is removably stored therein, said seat belt storage structure comprising:

an inner cloth cell made of a cloth which is inserted and attached in said recessed hole of said seat back, wherein said seat back comprises a covering member and an elastic foam padding such that said foam padding is covered with said covering member, wherein said inner cloth cell is jointed by sewing to said covering member, whereby a seat belt storage is defined in the said seat back to permit storage of said seat belt in said recessed hole, wherein said recessed hole has a mouth portion having an opening which is narrow relative to an inner hollow of said hole, so as to prevent said end of said seat belt form falling out of said hole, wherein said recessed hole is located at a lower point on said seat back and adjacent to the junction of said seat back and said seat cushion when said seat is in the seat position, and wherein said recess hole extends slightly upward with respect to a line perpendicular to said seat back.

2. A seat belt storage structure in a hinged seat, in which said hinged seat includes a set cushion hinged at a first hinge point and a seat back hinged at a second hinged point, such that said seat cushion and seat back are respectively rotatable about said first and second hinge points in a forward direction, and in which a recessed hole is formed in said seat back, said recessed hole being so adapted that an end of a seat belt is removably stored therein, said seat belt storage structure comprising:

an inner cloth cell made of a cloth which is inserted and attached in said recessed hole of said seat back, wherein said seat back comprises a covering member and an elastic foam padding such that said foam padding is covered with said covering member, wherein said inner cloth cell is jointed by sewing to said covering member, whereby a seat belt storage slit is defined in the said seat back to permit storage of said seat belt in said recessed hole, wherein said recessed hole has a mouth portion having an opening which is narrow relative to an inner hollow of said hole, so as to prevent said end of said seat belt from falling out of said hole, wherein said recessed hole is located at a lower point on said seat back and adjacent to the junction of said seat back and said seat cushion when said seat is in the seat position, and wherein said hole progressively diverges in cross sectional area from a dimension of said mouth as distance from said mouth increases.

* * * * *